(12) United States Patent
Fujii et al.

(10) Patent No.: US 8,012,058 B2
(45) Date of Patent: Sep. 6, 2011

(54) DIFFERENTIAL GEAR MECHANISM FOR VEHICLE

(75) Inventors: Noriyuki Fujii, Woluwe-Saint-Lambert (BE); Makoto Nishiji, Woluwe-Saint-Lambert (BE); Noel R. Barnes, II, Victor, NY (US)

(73) Assignee: JTEKT Corporation, Osaka-shi (JP)

( * ) Notice: Subject to any disclaimer, the term of this patent is extended or adjusted under 35 U.S.C. 154(b) by 431 days.

(21) Appl. No.: 12/354,217

(22) Filed: Jan. 15, 2009

(65) Prior Publication Data
US 2009/0186739 A1   Jul. 23, 2009

(30) Foreign Application Priority Data
Jan. 22, 2008   (JP) .................................. 2008-011404

(51) Int. Cl.
*F16H 48/20* (2006.01)
(52) U.S. Cl. ........................................................ 475/249
(58) Field of Classification Search .................. None
See application file for complete search history.

(56) References Cited

U.S. PATENT DOCUMENTS

| | | | | |
|---|---|---|---|---|
| 3,375,736 A * | 4/1968 | Saari | ............................. | 475/160 |
| 5,169,370 A * | 12/1992 | Dye et al. | ...................... | 475/227 |
| 5,529,547 A * | 6/1996 | Okuda et al. | .................. | 475/249 |
| 5,599,250 A * | 2/1997 | Nakajima et al. | ............. | 475/249 |
| 5,735,766 A * | 4/1998 | Sacchettini et al. | .......... | 475/249 |
| 5,957,801 A * | 9/1999 | Barnes, II | ...................... | 475/249 |
| 6,634,979 B1 * | 10/2003 | Quaife | .......................... | 475/249 |

FOREIGN PATENT DOCUMENTS
JP    8-268099    10/1996

* cited by examiner

*Primary Examiner* — Dirk Wright
(74) *Attorney, Agent, or Firm* — Oblon, Spivak, McClelland, Maier & Neustadt, L.L.P.

(57) ABSTRACT

A differential gear mechanism includes a housing, first and second sun gears each including an external gear portion, and first and second planetary gears. The first and second sun gears include axial end surfaces pressed against contact surfaces provided at the housing by the first and second sun gears by means of thrust forces generated at engagement surfaces between the external gear portions and the planetary gears. Each of the sun gears includes a first portion having the external gear portion, a second portion, and a thrust force generating mechanism for generating thrust forces at the first portion and the second portion. A direction of the thrust force generated at the first portion by the thrust force generating mechanism is specified to be equal to a direction of the thrust force generated at the first portion by means of the engagement between the external gear portion and the planetary gear.

5 Claims, 6 Drawing Sheets

DIFFERENTIAL GEAR MECHANISM FOR VEHICLE

CROSS REFERENCE TO RELATED APPLICATIONS

This application is based on and claims priority under 35 U.S.C. §119 to Japanese Patent Application No. 2008-011404, filed on Jan. 22, 2008, the entire content of which is incorporated herein by reference.

FIELD OF THE INVENTION

This invention generally relates to a differential gear mechanism for a vehicle.

BACKGROUND

A known differential gear mechanism disclosed in JP8-268099A (corresponding to U.S. Pat. No. 5,735,766), for example, includes a housing rotationally driven about a rotational axis thereof, a pair of sun gears coaxial with the rotational axis and including external gear portions at outer peripheral surfaces, respectively, and a pair of planetary gears rotatably received in the housing and engaging with the pair of sun gears, respectively. The pair of planetary gears also engages with each other. The sun gears are in connection with output shafts, respectively, in a non-rotatable manner. Accordingly, when the housing is driven to rotate by an engine, the rotational driving force (i.e., torque) supplied by the engine to the housing is transmitted to the sun gears and further to left and right wheels via the respective output shafts.

The external gear portions of the sun gears and the planetary gears include helical teeth, respectively. Thus, a thrust force is generated at an engagement portion between each of the external gear portions of the sun gears and each of the planetary gears. Because of the thrust force, the sun gears are subjected to force in the direction of the rotational axis of the sun gears. An axial end surface of each of the sun gears is pressed against each contact surface provided inside of the housing. Accordingly, at the time of differential rotation of the sun gears, a frictional resistance is generated between the end surface of each of the sun gears and the contact surface of the housing for restricting the rotation of the sun gears. The differential rotation of the sun gears is limited because of the frictional resistance.

These days, in order to improve traveling ability of a vehicle, an increase of differential limiting force is desired. In responding to such desire, it is considered to increase helical angles of the external gear portion and the planetary gear for the purpose of increasing the thrust force generated at the engagement portions therebetween. The larger the thrust force is, the greater the friction resistance is generated between the contact surface of the housing and the end surface of each of the sun gears, thereby increasing the differential limiting force. However, increasing the helical angle of each of the gears more than a certain level is difficult in view of strength, and the like. Therefore, the increase of the thrust force is limited to a certain extent, which results in difficulty in increasing the differential limiting force.

SUMMARY OF THE INVENTION

According to an aspect of the present invention, a differential gear mechanism for a vehicle includes a housing driven to rotate about a rotational axis and including contact surfaces, first and second sun gears provided within the housing to be rotatable about the rotational axis, each of the first and second sun gears including an external gear portion at an outer periphery, and first and second planetary gears rotatably provided within the housing and engaging with the external gear portions of the sun gears respectively, the planetary gears engaging with each other. The first and second sun gears include axial end surfaces respectively pressed against the contact surfaces of the housing by the first and second sun gears being pressed along the rotational axis by means of thrust forces generated at engagement surfaces between the external gear portions of the first and second sun gears and the first and second planetary gears respectively. Each of the first and second sun gears includes a first portion having the external gear portion, a second portion formed separately from the first portion, and a thrust force generating mechanism formed between the first portion and the second portion for generating thrust forces at the first portion and the second portion in a direction parallel with the rotational axis when a power transmission is performed between the first portion and the second portion. A direction of the thrust force generated at the first portion by the thrust force generating mechanism is specified to be equal to a direction of the thrust force generated at the first portion by means of the engagement between each of the external gear portions and each of the first and second planetary gears.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of the present invention will be explained with reference to FIGS. 1 to 5. A differential gear mechanism for a vehicle (hereinafter simply referred to as a differential gear mechanism) 1 includes a housing 2, a pair of sun gears (first and second sun gears) 3 and 4, and a pair of planetary gears (first and second planetary gears) 5 and 6. According to the first embodiment, three pairs of planetary gears 5 and 6 are provided.

Figure 1:
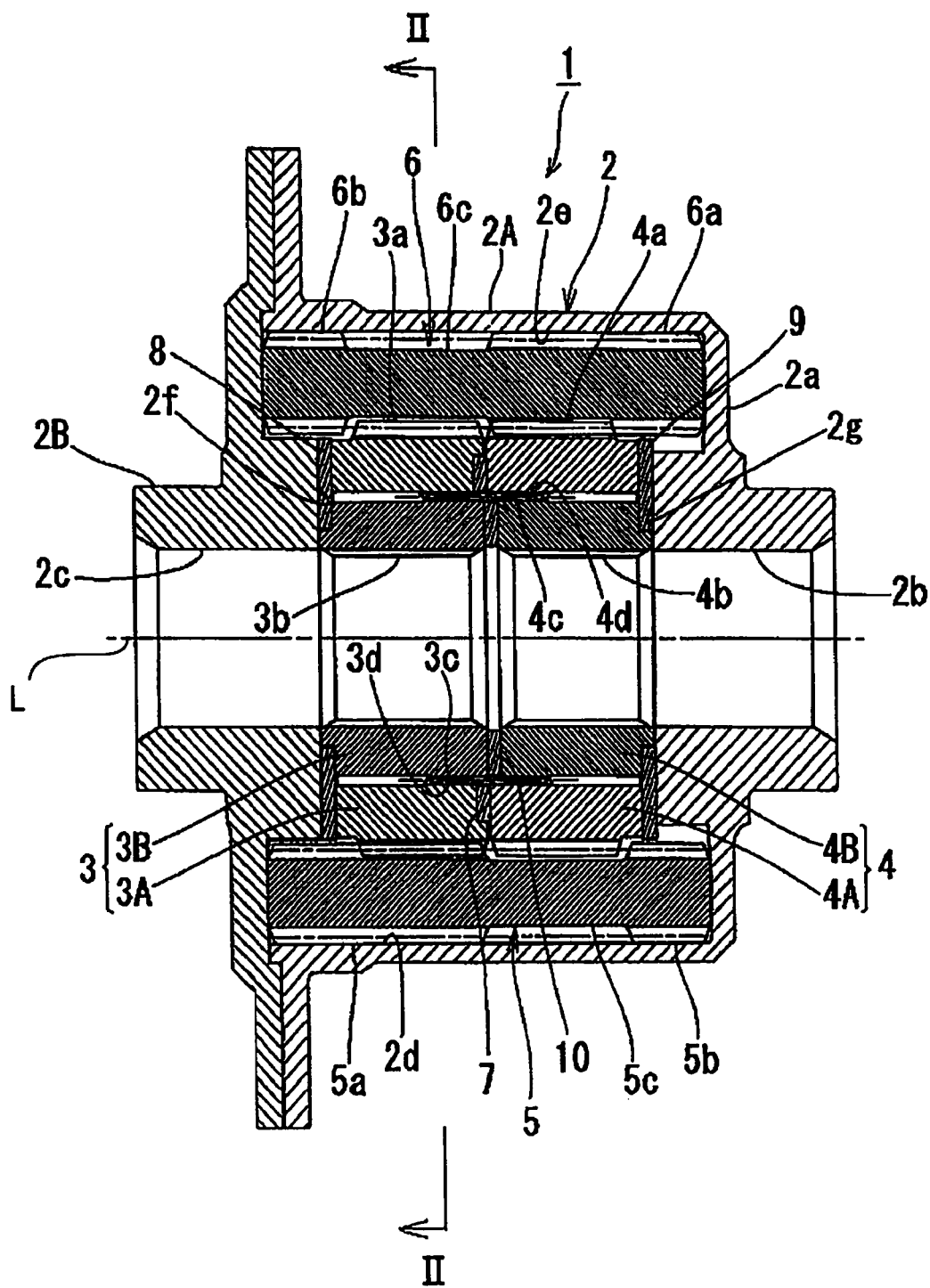
FIG. 1 is a longitudinal sectional view illustrating a differential gear mechanism for a vehicle according to a first embodiment of the present invention and taken along the line I-I of FIG. 2.
Figure 3:
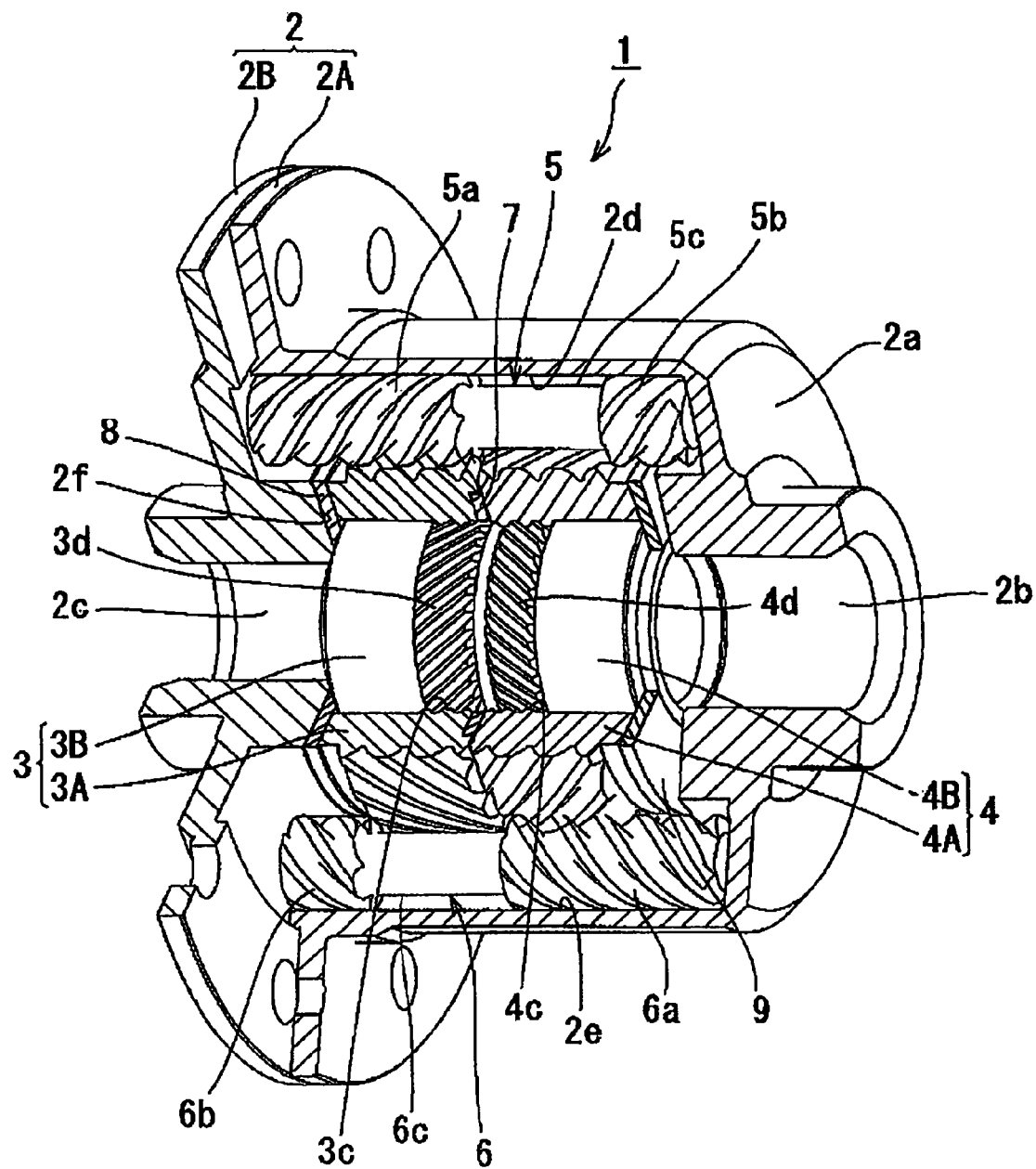
FIG. 3 is a partially cut-away perspective view illustrating the differential gear mechanism according to the first embodiment of the present invention.
Figure 4:
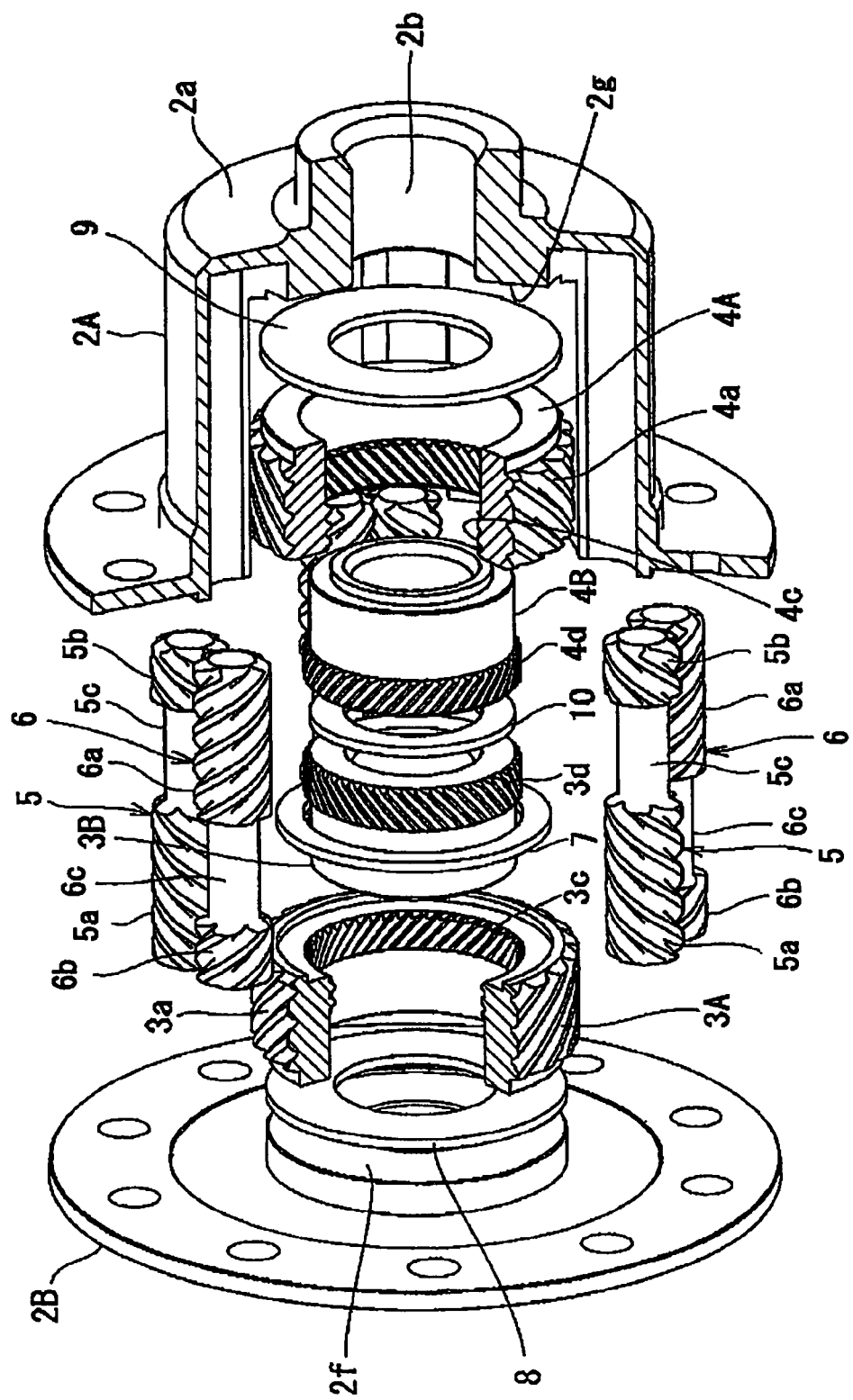
FIG. 4 is a partially cut-away exploded perspective view illustrating the differential gear mechanism for a vehicle according to the first embodiment of the present invention.

The housing 2 is driven by an engine for a vehicle to rotate about a rotational axis L. As illustrated in FIGS. 1, 3, and 4, the housing 2 includes a main body 2A and a cover 2B. The main body 2A includes a bottom portion 2a at one end and an opening portion at the other end, thereby forming a cylindrical shape with the bottom portion. The main body 2A is arranged in such a way that an axis thereof matches the rotational axis L. The cover 2B for covering the opening portion of the main body 2A is fixed, by means of a bolt(s), for example, to an end portion of the main body 2A where the opening portion is formed. Through holes 2b and 2c are formed at radially center portions of the bottom portion 2a of the main body 2A and the cover 2B, respectively. Axes of the through holes 2b and 2c both match the rotational axis L.

The pair of sun gears 3 and 4 is accommodated in the housing 2. The sun gears 3 and 4 each having a cylindrical shape are arranged in line with each other on the rotational axis L while axes of the sun gears 3 and 4 match the rotational axis L. In addition, the sun gears 3 and 4 are both arranged to be rotatable about the rotational axis L. External gear portions 3a and 4a each including helical teeth are formed at outer peripheries of the sun gears 3 and 4, respectively. The external gear portions 3a and 4a have the same gear specifications except that helical directions of the helical teeth of the external gear portions 3a and 4a are opposite from each other. Spline bores 3b and 4b each including straight teeth are formed at inner peripheries of the sun gears 3 and 4, respectively. An axial inner end portion of an output shaft penetrating through the through hole 2b is fitted to the spline bore 4b in a non-rotatable manner. In the same way, an axial inner end portion of an output shaft penetrating through the through hole 2c is fitted to the spline bore 3b. Axial outer end portions of the output shafts are connected to, for example, left and right wheels, respectively. Accordingly, when the sun gears 3 and 4 rotate, a resulting rotation torque is transmitted to the left and right wheels via the respective output shafts.

Figure 2:
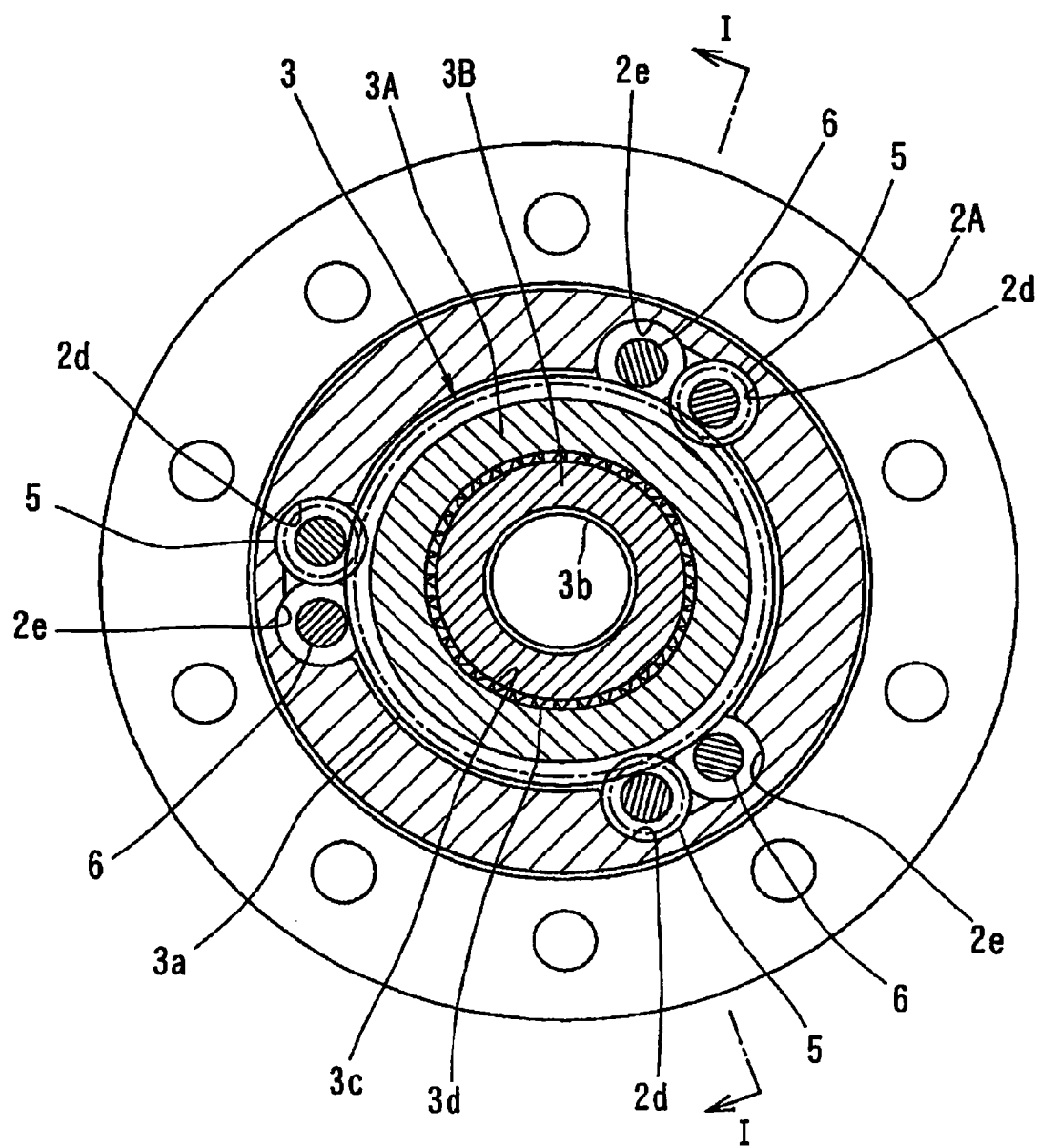
FIG. 2 is a cross-sectional view taken along the line II-II of FIG. 1.

At least one pair of receiving recess portions 2d and 2e is formed inside of the housing 2, extending in parallel with the rotational axis L. According to the first embodiment, three pairs of receiving recess portions 2d and 2e are formed at equal intervals on an inner periphery of the main body 2A as illustrated in FIG. 2. The planetary gears 5 and 6 are rotatably accommodated in the receiving recess portions 2d and 2e, respectively. Thus, the planetary gears 5 and 6 are each rotatable about its axis. In addition, the planetary gears 5 and 6 are rotatable about the rotational axis L in association with the rotation of the housing 2.

The planetary gears 5 and 6 in the same pair, for example, will be described below. The planetary gear 5 includes a long gear portion 5a at one end, a short gear portion 5b at the other end, and a connecting portion 5c between the long gear portion 5a and the short gear. portion 5b. The long gear portion 5a and the short gear portion 5b have the same gear specifications. The connecting portion 5c has an outer diameter substantially equal to or slightly smaller than a root circle of each of the long gear portion 5a and the short gear portion 5b. The planetary gear 6 has the same structure as that of the planetary gear 5. That is, the planetary gear 6 includes a long gear portion 6a, a short gear portion 6b, and a connecting portion 6c. However, the helical direction of the long gear portion 6a is opposite from that of the long gear portion 5a while the helical direction of the short gear portion 6b is opposite from that of the short gear portion 5b. In addition, as clearly seen from FIGS. 1 and 4, the planetary gear 6 is arranged in an opposite manner relative to the planetary gear 5.

The long gear portion 5a of the planetary gear 5 engages with the external gear portion 3a of the sun gear 3 at an axial inner end (i.e., substantially center portion of the planetary gear 5) (see FIG. 1) and engages with the short gear portion 6b of the planetary gear 6 at an axial outer end (see FIG. 4). In the same way, the long gear portion 6a of the planetary gear 6 engages with the external gear portion 4a of the sun gear 4 at an axial inner end (see FIG. 1) and engages with the short gear portion 5b of the planetary gear 5 at an axial outer end (see FIG. 4). Accordingly, when the housing 2 is driven to rotate about the rotational axis L, the rotation of the housing 2 is transmitted to the sun gears 3 and 4 via the planetary gears 5 and 6, and is further transmitted to the output shafts.

Figure 5:
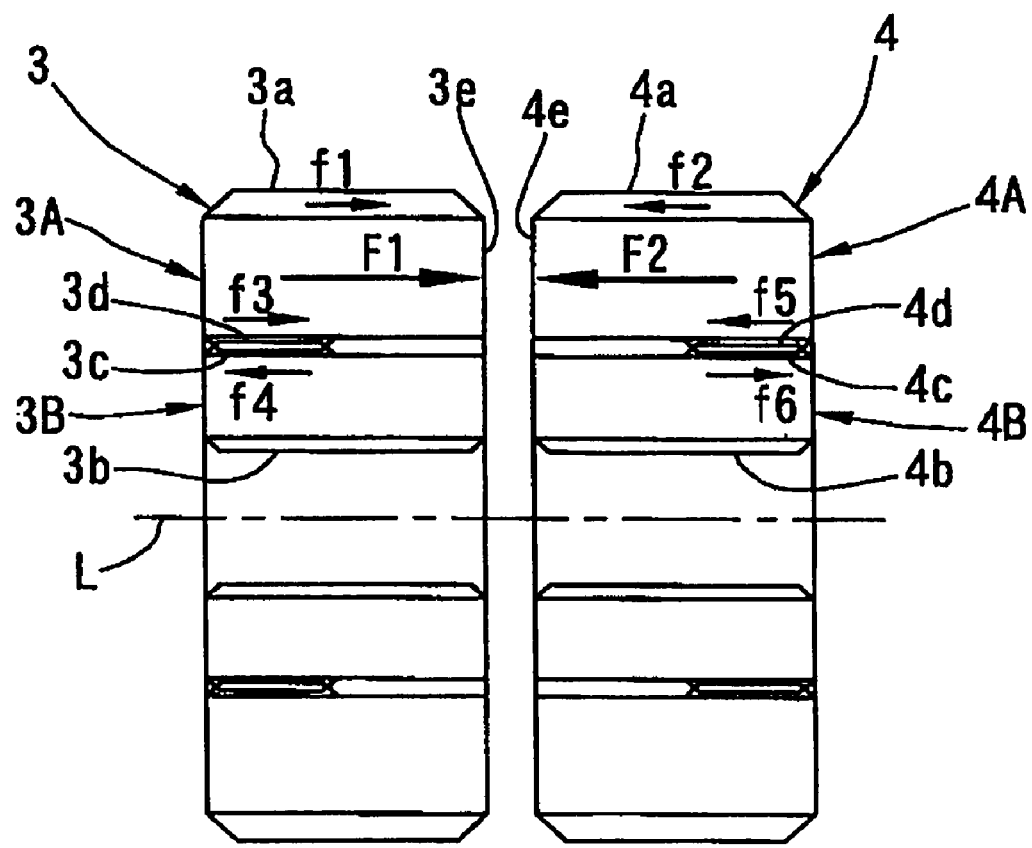
FIG. 5 is an explanatory view illustrating a pair of sun gears provided at the differential gear mechanism and a thrust force applied to the sun gears according to the first embodiment of the present invention.

Because each of the external gear portions 3a and 4a, the long gear portions 5a and 6a includes the helical teeth, thrust forces f1 and f2 are generated respectively along the rotational axis L at engagement surfaces of the external gear portions 3a and 4a relative to the long gear portions 5a and 6a, respectively (see FIG. 5). According to the first embodiment, when a vehicle is driven by an engine to move forward, the thrust forces f1 and f2 act towards each other. When an engine brake is applied, the thrust forces f1 and f2 act away from each other. Alternatively, the thrust forces f1 and f2 may act away from each other when the vehicle is driven by the engine to move forward and act towards each other when the engine brake is applied.

Because of the engagement between the external gear portion 3a and the long gear portion 5a, and between the external gear portion 4a and the long gear portion 6a, thrust forces acting in an opposite direction from those of the thrust forces f1 an f2 and having the same magnitude as those of the thrust forces f1 and f2 are generated at engagement surfaces of the long gear portions 5a and 6a relative to the external gear portions 3a and 4a. Axial end surfaces of the planetary gears 5 and 6 are pressed by the thrust forces against the housing 2. Accordingly, at a time of differential rotation of the sun gears 3 and 4, a frictional resistance is generated between the end surfaces of the planetary gears 5 and 6, and the housing 2, thereby limiting rotations of the planetary gears 5 and 6, and further limiting the differential rotation of the sun gears 3 and 4.

The sun gear 3 is divided into two cylindrical portions at a substantially radially center portion. That is, the sun gear 3 includes an outer portion 3A (first portion) arranged at a radially outer side and an inner portion 3B (second portion) arranged at a radially inner side. The external gear portion 3a is formed at an outer periphery of the outer portion 3A while the spline bore 3b is formed at an inner periphery of the inner portion 3B.

A spline bore 3c is formed at an inner periphery of the outer portion 3A of the sun gear 3. In addition, a spline portion 3d is formed at an outer periphery of the inner portion 3B of the sun gear 3. The spline bore 3c and the spline portion 3d collectively serve as a thrust force generating mechanism. The spline portion 3d engages with the spline bore 3c to thereby connect the outer portion 3A and the inner portion 3B in such a way that the outer portion 3A and the inner portion 3B are prevented from relatively rotating to each other (however, specifically, in the cases where the outer portion 3A and the inner portion 3B move by a small distance along the rotational axis L, the outer portion 3A and the inner portion 3B rotate relative to each other by a small angle corresponding to the small movement). A rotating torque is securely transmitted between the outer portion 3A and the inner portion 3B.

The spline bore 3c and the spline portion 3d both include helical teeth. When the rotating torque is transmitted to the outer portion 3A by the engagement between the external gear portion 3a and the planetary gear 5, or is transmitted to the inner portion 3B from the output shaft, thrust forces f3 and f4 (see FIG. 5) are generated along the rotational axis L at engagement surfaces of the spline bore 3c and the spline portion 3d, respectively. The thrust force f3 acts on the outer portion 3A, in the same direction as the thrust force f1. That is, the helical directions of the helical teeth formed at the spline bore 3c and the spline portion 3d are determined so that the thrust force f3 acts in the same direction as the thrust force f1. Because the acting direction of the thrust force f3 is same as that of the thrust force f1, a thrust force F1 obtained by a sum of the thrust forces f1 and f3 acts on the outer portion 3A. The thrust force f4, which acts on the inner portion 3B, has the same magnitude as that of the thrust force f3 and acts in an opposite direction from the thrust force f3.

The aforementioned structure of the sun gear 3 is also applied to the sun gear 4. The sun gear 4 consists of an outer portion 4A (first portion) including the external gear portion 4a and an inner portion 4B (second portion) including the spline bore 4b. A spline bore 4c is formed at an inner periphery of the outer portion 4A while a spline portion 4d is formed at an outer periphery of the inner portion 4B. The spline bore 4c and the spline portion 4d collectively serve as a thrust force generating mechanism. The spline bore 4c and the spline portion 4d both include helical teeth. The outer portion 4A and the inner portion 4B are connected to each other so as to be non-rotatable by the engagement between the spline portion 4d and the spline bore 4c. A thrust force f5 (see FIG. 5) acts on the outer portion 4A in the same direction as the thrust force f2. Accordingly, a thrust force F2 obtained by a sum of the thrust forces f2 and f5 acts on the outer portion 4A. In addition, a thrust force f6 having the same magnitude as that of the thrust force f5 acts in an opposite direction from the thrust force f5 acts on the inner portion 4B.

According to the differential gear mechanism 1 having the aforementioned structure, when the vehicle is driven to move forward, respective axial inner end surfaces of the outer portions 3A and 4A are pressed against both axial end surfaces (contact surfaces) of a center washer 7 by means of the thrust forces F1 and F2, respectively. In addition, respective axial outer end surfaces of the inner portions 3B and 4B are pressed against contact surfaces 2f and 2g formed at the housing 2 via end washers 8 and 9 by means of the thrust forces f4 and f6, respectively. Accordingly, at the time of the differential rotation of the sun gears 3 and 4, the friction resistances are generated between the axial inner end surfaces of the outer portions 3A and 4A, and between the axial outer end surfaces of the inner portions 3B and 4B, and the contact surfaces 2f and 2g, respectively. Accordingly, the differential rotation of the sun gears 3 and 4 is restricted.

When the engine brake is applied, respective axial outer end surfaces of the outer portions 3A and 4A are pressed against the contact surfaces 2f and 2g via the end washers 8 and 9, respectively. In addition, respective axial inner end surfaces of the inner portions 3B and 4B are pressed against both axial end surfaces (contact surfaces) of a center washer 10. At the time of the differential rotation of the sun gears 3 and 4, the friction resistances are generated between the axial outer end surfaces of the outer portions 3A and 4A and the contact surfaces 2f and 2g, respectively, and between the axial inner end surfaces of the inner portions 3B and 4B. Accordingly, the differential rotation of the sun gears 3 and 4 is restricted.

Consequently, the thrust force F1 including the thrust forces f3 and f1, and the thrust force F2 including the thrust forces f5 and f2 act on the sun gears 3 and 4, respectively. In addition, the thrust force f4 and the thrust force f6 act on the inner portions 3B and 4B, respectively. Thus, at the time of the differential rotation of the sun gears 3 and 4, the friction resistance in response to the magnitude of each of the thrust forces F1 and F2 is generated on each of the outer portions 3A and 4A. In the same way, the friction resistance in response to the magnitude of each of the thrust forces f4 and f6 is generated on each of the inner portions 3B and 4B. Therefore, the friction resistance generated in response to the thrust forces f3 and f5 additionally acts on the sun gears 3 and 4 as compared to sun gears of a conventional differential gear mechanism. As a result, a force for restricting the differential rotation of the sun gears 3 and 4 (i.e., differential limiting force) can be increased, thereby improving traveling ability of a vehicle equipped with the differential gear mechanism 1.

In order to generate the uniform differential limiting force between the left and right wheels, the differential gear mechanism 1 is ideally provided at an intermediate portion between the left and right wheels. In addition, the output shafts for the left and right wheels have desirably the same length and thickness and support mechanisms for the left and right wheels are desirably equal to each other. However, depending on a layout of an engine, transmission, and/or other auxiliary machinery, the differential gear mechanism 1 may not be provided in the aforementioned ideal position. In such case, even when the differential gear mechanism 1 is constituted as illustrated in FIGS. 1 to 5, the magnitude of the rotating torque transmitted to the sun gear 3 may be different from that of the sun gear 4 at the time of the differential rotation thereof. According to a second embodiment explained below, further modification is added to the sun gears 3 and 4 in the first embodiment so as to solve such problem.

Figure 6:
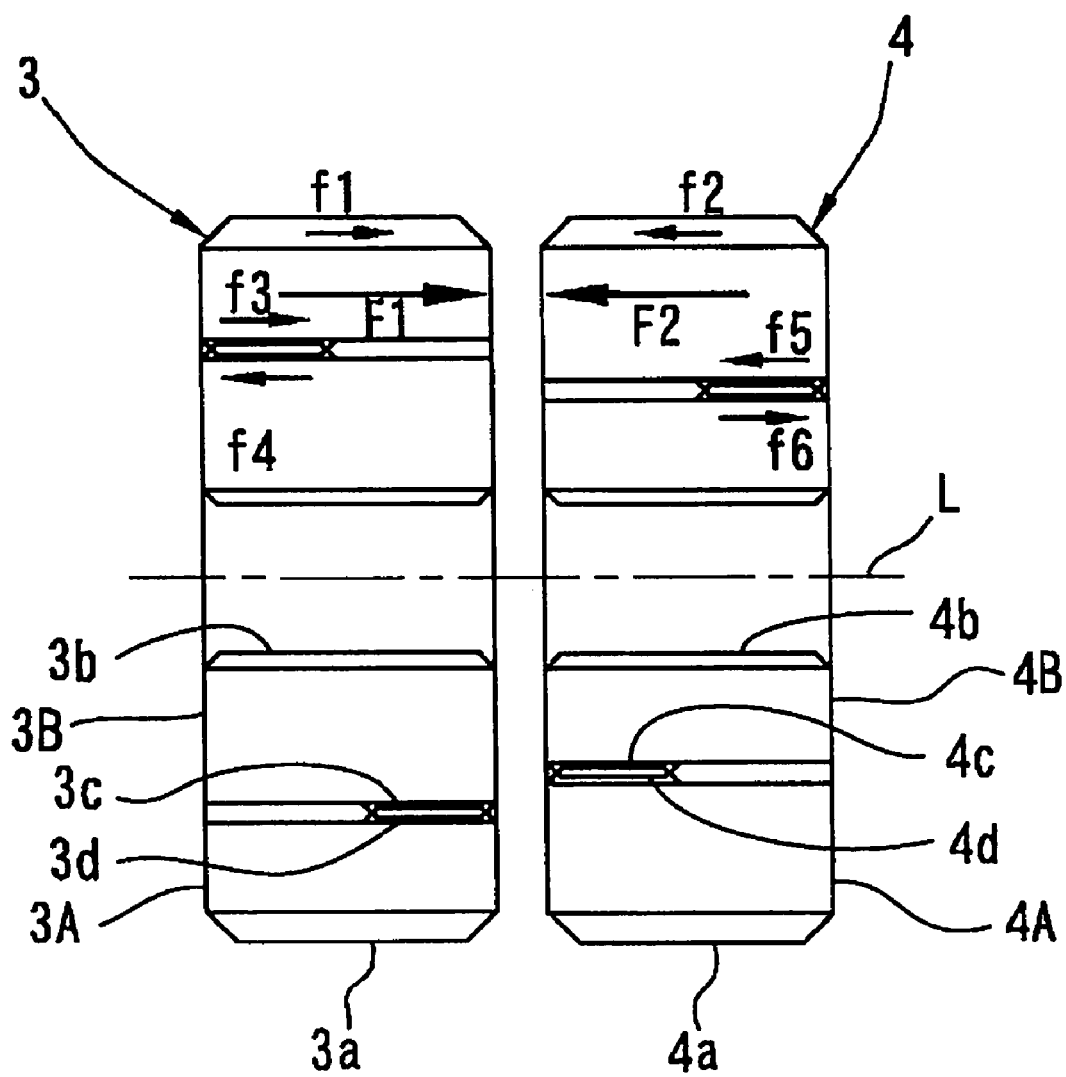
FIG. 6 is an explanatory view illustrating the pair of sun gears provided at the differential gear mechanism and the thrust force applied to the sun gears according to a second embodiment of the present invention.

FIG. 6 illustrates the sun gears 3 and 4 according to the second embodiment. As illustrated in FIG. 6, an outer diameter of the spline portion 3d of the sun gear 3 is larger than an outer diameter of the spline portion 4d of the sun gear 4. Even in such case, the thrust forces f1, f3, f4, and F1 acting on the sun gear 3 are equal to the thrust forces f2, f5, f6, and F2 acting on the sun gear 4, respectively, in the same way as described in the first embodiment. Because an inner diameter of the outer portion 3A (which is equal to an outer diameter of the inner portion 3B) and an inner diameter of the outer portion 4A (which is equal to an outer diameter of the inner portion 4B) are different from each other, the friction resistances generated at the sun gears 3 and 4 are different from each other. Accordingly, a ratio of the outer diameter of the spline portion 3d of the sun gear 3 to the outer diameter of the spline portion 4d of the sun gear 4 is specified depending on a structure of a driving force transmission system including the differential gear mechanism and the output shafts to thereby bring the rotating torques to be uniformly transmitted to the left and right wheels at the time of the differential rotation in a state where the differential gear mechanism, the output shafts, and the like are mounted onto the vehicle.

Different friction resistances generated at the sun gears 3 and 4 from each other also can be achieved by differentiating the helical angles of the spline portions 3d and 4d of the sun gears 3 and 4 from each other, so that the magnitude of the thrust forces f3 (f4) and f5 (f6) vary from each other. The different helical angles of the spline portions 3d and 4d and the different sizes of the outer diameters of the spline portions 3d and 4d may be combined appropriately.

The aforementioned embodiments may be appropriately modified as long as its major principle is unchanged. For example, according to the aforementioned embodiments, the sun gears 3 and 4, and the planetary gears 5 and 6 all include helical gears. In addition, the sun gears 3 and 4 and the planetary gears 5 and 6 are arranged in parallel with each other. Alternatively, the sun gears 3 and 4, and the planetary gears 5 and 6 may have bevel gears. Then, the sun gears 3 and 4 may be arranged on the rotational axis L while the planetary gears 5 and 6 may be arranged on a line perpendicular to the rotational axis L.

According to the aforementioned embodiments, the outer portion 3A of the sun gear 3 receives the thrust force generated by the engagement between the external gear portion 3a and each of the planetary gears 5 and 6, and the thrust force generated by the spline fitting between the outer portion 3A and the inner portion 3B. In the same way, the outer portion 4A of the sun gear 4 receives the thrust force generated by the engagement between the external gear portion 4a and each of the planetary gears 5 and 6, and the thrust force generated by the spline fitting between the outer portion 4A and the inner portion 4B. The acting directions of these two thrust forces are same as each other. Thus, as compared to a sun gear of a conventional differential gear mechanism for a vehicle (conventional sun gear), the thrust force larger than that of the conventional sun gear by the thrust force resulting from the spline fitting is generated at the outer portions 3A and 4A according to the aforementioned embodiments. The differential limiting force for restricting the differential rotation of the pair of sun gears 3 and 4 can be increased, accordingly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A differential gear mechanism for a vehicle, comprising:
a housing driven to rotate about a rotational axis and including contact surfaces;
first and second sun gears provided within the housing to be rotatable about the rotational axis, each of the first and second sun gears including an external gear portion at an outer periphery;
first and second planetary gears rotatably provided within the housing and engaging with the external gear portions of the sun gears respectively, the planetary gears engaging with each other;
the first and second sun gears including axial end surfaces respectively pressed against the contact surfaces of the housing by the first and second sun gears being pressed along the rotational axis by means of thrust forces generated at engagement surfaces between the external gear portions of the first and second sun gears and the first and second planetary gears respectively; and
each of the first and second sun gears including a first portion having the external gear portion, a second portion formed separately from the first portion, and a thrust force generating mechanism formed between the first portion and the second portion for generating thrust forces at the first portion and the second portion in a direction parallel with the rotational axis when a power transmission is performed between the first portion and the second portion, wherein a direction of the thrust force generated at the first portion by the thrust force generating mechanism is specified to be equal to a direction of the thrust force generated at the first portion by means of the engagement between each of the external gear portions and each of the first and second planetary gears.

2. A differential gear mechanism according to claim 1, wherein the external gear portions and the first and second planetary gears include helical teeth respectively and the first and second plant gears are arranged in parallel with the rotational axis.

3. A differential gear mechanism according to claim 2, wherein each of the thrust force generating mechanisms includes a spline bore formed at an inner periphery of the first portion and including helical teeth and a spline portion formed at an outer periphery of the second portion and engaging with the spline bore of the first portion, the first portion forming a cylindrical shape.

4. A differential gear mechanism according to claim 3, wherein an outer diameter of the spline portion of one of the first and second sun gears is different from an outer diameter of the spline portion of the other one of the first and second sun gears.

5. A differential gear mechanism according to claim 3, wherein a helical angle of the spline portion of one of the first and second sun gears is different from a helical angle of the spline portion of the other one of the first and second sun gears.

* * * * *